April 30, 1940.    M. KLAVÍK    2,199,316

AIR COOLING OF AUTOMOBILES

Filed Dec. 20, 1938

Inventor
Milos Klavík
By Bilinger, Atty.

Patented Apr. 30, 1940

2,199,316

UNITED STATES PATENT OFFICE 2,199,316

AIR COOLING OF AUTOMOBILES

Miloš Klavík, Prague, Czechoslovakia

Application December 20, 1938, Serial No. 246,918
In Czechoslovakia October 7, 1937

2 Claims. (Cl. 180—54)

This application corresponds to the applications of Zavody Ringhoffer—Tatra a. s., a Czechoslovakian body corporate, of Prague-Smichov, Czechoslovakia, Nos. P. 6,336, which was filed in Czechoslovakia on October 7, 1937 and 28,769/38 which was filed in Great Britain on October 4, 1938.

In automobiles having a streamline body and rear engine, the air required for cooling the engine is supplied most usually through slots provided between the actual body and the adjoining cover of the engine chamber. These slots are formed by setting back the wall of the body in suitably selected zones, either at the upper surface or on both sides, relatively to the general form of the body and of the engine cover. An air supply of such a kind, however, has the disadvantage that during rapid travel the stream of air passes the slots without entering them, while in addition the internal useful space of the body is restricted.

According to the invention, an undisturbed air supply to the rear engine chamber is effected by forming at suitably selected places of the cover, at the top or at the sides, at the edge where said cover adjoins the wall of the actual body, bent portions which project outwardly and gradually merge into the surface of the cover. Openings under the cover are thereby formed, into which the air is forced directly, but unnecessary eddying of the air is prevented by the gradual merging into the surface of the cover. For this purpose also, the edges of these bent portions are not made sharp but of streamline cross-section.

A constructional example of the invention is shown in the accompanying drawing.

Figure 1:
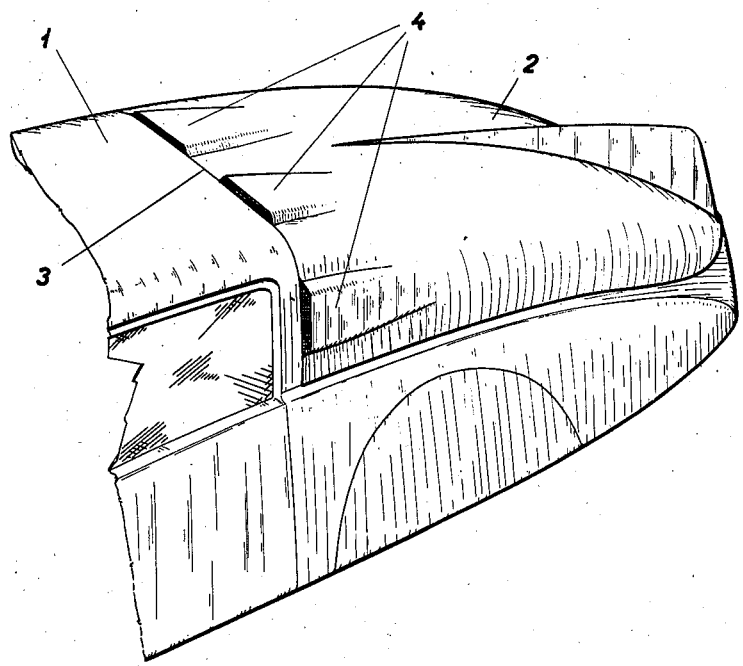
Figure 2:
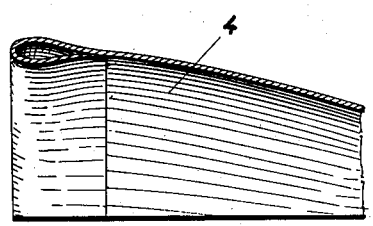

Figure 1 shows in perspective an engine cover with bent portions for the aspiration of air, and Figure 2 shows a section through the edge of a bent portion.

The rear part 1 of the body extends everywhere uniformly in the correct streamline form. The cover 2 of the engine chamber adjoining said part 1 has an edge 3 which is bent outwardly at suitable places, so as to form pocket-like bent portions 4 which gradually merge into the continuous surface of the cover. The edge of these bent portions 4 is strengthened and rounded in such a manner as to possess a streamline cross-section as shown in Figure 2.

I claim:

1. In the air-cooling of automobiles with engine at the rear and streamline body, a cover for the engine adjoining the body and pocket-shaped bent portions in the cover where the cover adjoins the body, said bent portions projecting outwardly and merging into the engine cover and forming for the cooling air over the top and sides of the vehicle, a plurality of channels to the engine compartment.

2. In the air cooling of automobiles with engine at the rear and streamline body, a cover for the engine adjoining the body, outwardly projecting pocket-shaped bent portions merging into the cover where the cover adjoins the body, and streamline portions and stream-lined strengthening means on the forward edges of the pocket-shaped portions.

MILOŠ KLAVÍK.